Patented Dec. 16, 1930

1,785,099

UNITED STATES PATENT OFFICE

JAMES H. SHERTS, OF GLEN RIDGE, NEW JERSEY, ASSIGNOR TO DUPLATE CORPORATION, A CORPORATION OF DELAWARE

PROCESS OF PREPARING COMPOSITE GLASS FOR SEALING

No Drawing.   Application filed May 26, 1928.   Serial No. 280,958.

The invention relates to a process for preparing composite glass for sealing. Such glass ordinarily comprises a pair of sheets of glass cemented to a thin sheet of reinforcing material of pyroxylin plastic such as, celluloid and the like. It has been found desirable after the sheets are cemented together and the edges smoothed up to perform an operation known as "sealing". This consists in cutting out the reinforcing sheet and in some cases some of the glass around the periphery of the composite plate to a depth of an eighth of an inch or less and then filling the groove thus formed with a sealing material of tough insoluble material; such as, pitch, varnish or the like. The cutting out of this groove has heretofore been accomplished by the use of cutting wheels or hand tools and involves a considerable item of expense. It also is difficult to cut out a groove of such uniformity and smoothness that the operation will not mar the appearance of the glass. The present invention has for its objects; (1) the provision of a process for removing the reinforcing material to provide the sealing groove, which will accomplish the desired result at a low cost as compared with the cutting operations; and (2) which will remove the material to a uniform depth throughout the length of the groove, so that when the groove is properly sealed, the appearance of the composite plate will not have been impaired to the slightest degree.

This result is secured by exposing the edges of the sheet to the action of an acid or other similar agent which will not affect the glass, but which will react with the reinforcing material and remove or dissolve it to the depth necessary to provide a groove of the desired depth, the product of the decomposition being then washed away.

The agent most suitable for this work is sulphuric acid of standard or commercial concentration; namely, about 95 per cent. This may be used at varying temperatures and the period of exposure may vary depending on the depth of groove which it is desired to form. A temperature of 150 degrees F. gives very satisfactory results. When used at this temperature, the reinforcing material is removed to a depth of about five to seven one-thousandths of an inch during a five-minute period of exposure. As the temperature of the acid is dropped, the period of exposure required for the reaction is increased. Similarly, the period of exposure may be decreased as the temperature is increased, but at a temperature of 190 degrees F., the result becomes less satisfactory due to the decomposition of the reinforcing material and the formation of bubbles. The treatment of the composite plates by the acid is preferably effected by submerging a plurality of the plates (supported in a rack) in a tank containing a relatively large quantity of the acid, after which the plates are removed, drained and washed to remove the soluble substance constituting the reaction product.

Other acids may be substituted for the sulphuric, the most available being hydrochloric acid having a concentration of about 95 per cent. This acid is also preferably used at a temperature of about 150 degrees Fahrenheit.

A solution of caustic soda may also be used to react with the pyroxylin plastic, but such solution also reacts, although less actively, with the glass so that if this solution is employed, it is necessary to limit the contact of the caustic with the extreme edges only of the composite plates. A solution containing 25 per cent of caustic may be used, preferably at a temperature of about 150 degrees Fahrenheit.

What I claim is:

1. The process of removing the periphery of the reinforcing sheet lying between a pair of glass sheets in a composite plate, which consists in subjecting the edges of the plate to the action of a corrosive liquid which will react with the material of the reinforcing sheet to form a soluble reaction product and remove the edges of the reinforcing sheet to a point inside the edges of the glass sheets and then washing away such product.

2. The process of removing the periphery of the reinforcing sheet lying between a pair of glass sheets in a composite plate which consists in submerging the edges of the plate in a corrosive liquid which will react with the material of the reinforcing sheet but which will not react with the glass, and leaving the edges of the plate in the liquid until the edges of the reinforcing sheet have been removed to a point inside the edges of the glass sheet.

3. The process of removing the periphery of a pyroxylin plastic sheet lying between a pair of glass sheets in a composite plate, which consists in subjecting the edges of the plate to the action of concentrated sulphuric acid until the edges of the plastic sheet are removed to a point inside the edges of the glass sheet.

In testimony whereof, I have hereunto subscribed my name this 18th day of May, 1928.

JAMES H. SHERTS.